(12) United States Patent
Shen

(10) Patent No.: US 10,624,191 B1
(45) Date of Patent: *Apr. 14, 2020

(54) CONTROLLER FOR SEVEN-MODE FLOWING LAMP AND POWER PLUG

(71) Applicant: NINGBO GOLDEN POWER ELECTRONIC CO., LTD., Ningbo (CN)

(72) Inventor: Zhengxian Shen, Ningbo (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/354,572

(22) Filed: Mar. 15, 2019

(30) Foreign Application Priority Data

Nov. 23, 2018 (CN) .................... 2018 2 1940087 U

(51) Int. Cl.
*H05B 45/44* (2020.01)
*H05B 45/50* (2020.01)
*H05B 47/19* (2020.01)

(52) U.S. Cl.
CPC ............ *H05B 45/44* (2020.01); *H05B 45/50* (2020.01); *H05B 47/19* (2020.01)

(58) Field of Classification Search
None
See application file for complete search history.

(56) References Cited

U.S. PATENT DOCUMENTS

| | | | | |
|---|---|---|---|---|
| 8,194,133 B2* | 6/2012 | DeWind | ................ | B60K 35/00 348/148 |
| 9,839,103 B2* | 12/2017 | Avrahamy | ................ | C02F 1/42 |
| 9,867,263 B2* | 1/2018 | Avrahamy | ........... | H05B 39/086 |
| 2007/0132315 A1* | 6/2007 | Wang | ........................ | G06F 1/26 307/18 |
| 2008/0266389 A1* | 10/2008 | DeWind | ................ | B60K 35/00 348/115 |
| 2012/0013257 A1* | 1/2012 | Sibert | .................... | H05B 37/02 315/152 |
| 2012/0236152 A1* | 9/2012 | De Wind | ............... | B60K 35/00 348/148 |
| 2012/0306435 A1* | 12/2012 | Tu | ........................ | H02J 7/0052 320/107 |
| 2016/0099596 A1* | 4/2016 | Chien | ................... | H02J 7/0052 368/10 |
| 2016/0153650 A1* | 6/2016 | Chien | ................. | F21V 33/0004 362/253 |
| 2017/0086281 A1* | 3/2017 | Avrahamy | ................ | C02F 1/42 |
| 2017/0159929 A1* | 6/2017 | Li | ........................ | F21V 33/0024 |
| 2017/0265287 A1* | 9/2017 | Avrahamy | ................ | C02F 1/42 |
| 2019/0215923 A1* | 7/2019 | Shen | ................... | H05B 33/0842 |

* cited by examiner

*Primary Examiner* — Alexander H Taningco
*Assistant Examiner* — Srinivas Sathiraju
(74) *Attorney, Agent, or Firm* — W&K IP

(57) ABSTRACT

A controller for a seven-mode flowing lamp is disclosed herein which is disposed between a power source and a plurality of sets of lamp strips. The controller comprises: a reverse protection unit electrically connected to the power source to prevent the power source from being reversely connected; an infrared receiving unit electrically connected to the reverse protection unit for receiving an infrared signal transmitted by an infrared terminal; a control unit electrically connected to the reverse protection unit and the infrared receiving unit to parse the infrared signal and issue a plurality of control signals; and a plurality of driving units disposed between the control unit and the lamp strip.

14 Claims, 3 Drawing Sheets

CONTROLLER FOR SEVEN-MODE FLOWING LAMP AND POWER PLUG

CROSS-REFERENCE TO RELATED APPLICATIONS

This application claims priority to Chinese Patent Application No. 201821940087.0 with a filing date of Nov. 23, 2018. The content of the aforementioned application, including any intervening amendments thereto, are incorporated herein by reference.

TECHNICAL FIELD

The present disclosure relates to the field of controllers, and more particularly, to a controller for a seven-mode flowing lamp and a power plug.

BACKGROUND

The flowing lamp is controlled by a controller to alternately illuminate a row of lamp, thereby generating a light that flows like flowing water to give a dazzling visual effect. The flowing lamps have been used in a variety of occasions where colorful and dazzling lighting effects are required, especially in various lighting billboards, signage and shop signs. In practical applications, it is favorable to combine infrared mechanism with the controller to implement remote control on adjustment of the flow visual effect of the lamp strip.

SUMMARY

The present disclosure discloses a controller for a seven-mode flowing lamp which is disposed between a power source and a plurality of sets of lamp strips. The controller comprises: a reverse protection unit electrically connected to the power source to prevent the power source from being reversely connected; an infrared receiving unit electrically connected to the reverse protection unit for receiving an infrared signal transmitted by an infrared terminal; a control unit electrically connected to the reverse protection unit and the infrared receiving unit to parse the infrared signal and issue a plurality of control signals; and a plurality of driving units disposed between the control unit and the lamp strip. Each of the driving units receives one corresponding control signal to control a color and a frequency of light emission of the lamp strip. The control unit is composed of a single-chip U1. The signal receiving pin of the single-chip U1 is electrically connected with the infrared receiving unit. The reference signal output pin and two comparison signal output pins of the single-chip U1 are respectively connected to different input ends of the driving units. Each of the driving units includes a first MOS transistor and a second MOS transistor connected by a gate. The output ends of the first MOS transistor and the second MOS transistor are connected to a corresponding lamp strip of each driving unit. A fixed voltage is connected to a source or a drain of first MOS transistor and connected to a gate of the first MOS transistor via a first resistor. A drain or a source of the second MOS transistor is grounded. A gate of the second MOS transistor is grounded through a second resistor. The gate of the first MOS transistor is used as the input terminal of each driving unit. Each of driving units outputs a different voltage according to a corresponding control signal to take control of the lighting effect of the lamp strip.

In an embodiment, the driving unit comprises a first driving unit connected to a reference signal output pin of the single chip U1, a second driving unit connected to a comparison signal output pin of the single chip U1, and a third driving unit connected to another comparison signal output pin of the single chip U1. The drains of the first MOS transistor Q1 and the second MOS transistor Q2 of the first driving unit are connected to every set of lamp strip, the drains of the first MOS transistor Q5 and the second MOS transistor Q6 of the second driving unit are connected to two sets of lamp strips, and the drains of the first MOS transistor Q3 and the second MOS transistor Q4 of the third driving unit are connected to two other sets of lamp strips which comprise oppositely connected light emitting diodes. Through the adjustment of magnitude and frequency of the first comparison voltage, the second comparison voltage and the reference voltage of the three sets of controllers, the adjustment of the four sets of LED lights on the on/off control, the flicker frequency and the illumination intensity is achieved to generate a flowing visual effect.

In an embodiment, the reverse protection circuit includes a diode D1 and a capacitor C6 connected in parallel, the anode of the diode D1 is grounded and the cathode of the diode D1 is connected to the power source.

In an embodiment, the infrared receiving unit is composed of an infrared receiving chip QP1. A VCC pin of the infrared receiving chip QP1 is connected to the output end of the reverse protection circuit via a resistor R7, and the output pin of the infrared receiving chip QP1 is connected to the signal input pin of the single chip U1. In an embodiment, the single chip U1 is also connected to a crystal oscillator circuit. In an embodiment, the controller further includes a manual control unit. The manual control unit includes a button SW1. One end of the button SW1 is connected to a manual signal input pin of the single chip U1, and the other end of the button SW1 is grounded.

In an embodiment, the third pin of the single chip U1 is grounded through a series connected LED and a series connected resistor R9.

The present disclosure further discloses a power plug comprising the controller described above, a housing and a power converter disposed inside the housing. The controller is disposed in the within the housing. The power converter is electrically coupled to the controller.

The advantages of the embodiments include that the lamp strip can be controlled by infrared means, and the user can switch the modes of the flowing lamp, including 8 modes and the 4 levels of illumination intensity, through an infrared terminal at his convenience.

BRIEF DESCRIPTION OF THE DRAWINGS

Embodiments of the present disclosure are described more fully with reference to the accompanying drawings. The drawings are, however, to be construed as illustrative and not restriction.

Reference Labels: 1, reverse protection unit; 2, infrared receiving unit; 3, control unit; 4, driving unit; 5, manual control unit; 21, housing; 22, power converter; 23 controller.

BRIEF DESCRIPTION OF THE DRAWINGS

The concept of the present disclosure will be described below using terms commonly used by those skilled in the art to convey the substance of their work to others skilled in the art. However, these concepts of the disclosure may be embodied in many different forms and should not be construed as limited to the embodiments described herein. These embodiments are provided to make the disclosure more complete and thorough, and to fully convey the scope of the disclosure to those skilled in the art. It should also be noted that these embodiments are not mutually exclusive. Components, steps or elements from one embodiment may be assumed to exist or be used in another embodiment. The particular embodiments shown and described may be substituted for a variety of alternatives and/or equivalent implementations without departing from the scope of the embodiments of the present disclosure. This application is intended to cover any adaptations or variations of the embodiments discussed herein. It will be apparent to those skilled in the art that the alternative embodiments may be practiced using only some of the described aspects. The specific figures, materials, and configurations are described herein for purposes of illustration, and may be practiced by those skilled in the art without the specific details. In other instances, well-known features may be omitted or simplified so as not to obscure the illustrative embodiments.

Moreover, the terms "first," "second," and "third" are used for descriptive purposes only and are not to be construed as indicating or implying relative importance. Unless specifically stated and limited, the terms "provided", "mounted", "connected", and "coupled" are to be understood broadly, and may be, for example, a fixed connection, a detachable connection, or an integral connection; it can be a mechanical connection or an electrical connection; it can be directly connected or indirectly connected through an intermediate medium, which can be the internal connection of the two elements. The term "fixing" may be welding or screwing or snapping. The specific meanings of the above terms in the present disclosure can be understood by those skilled in the art in specific cases.

The controller for a seven-mode flowing lamp according to the present disclosure would be described hereinafter in conjunction with the accompanying drawings and embodiments.

Figure 1:
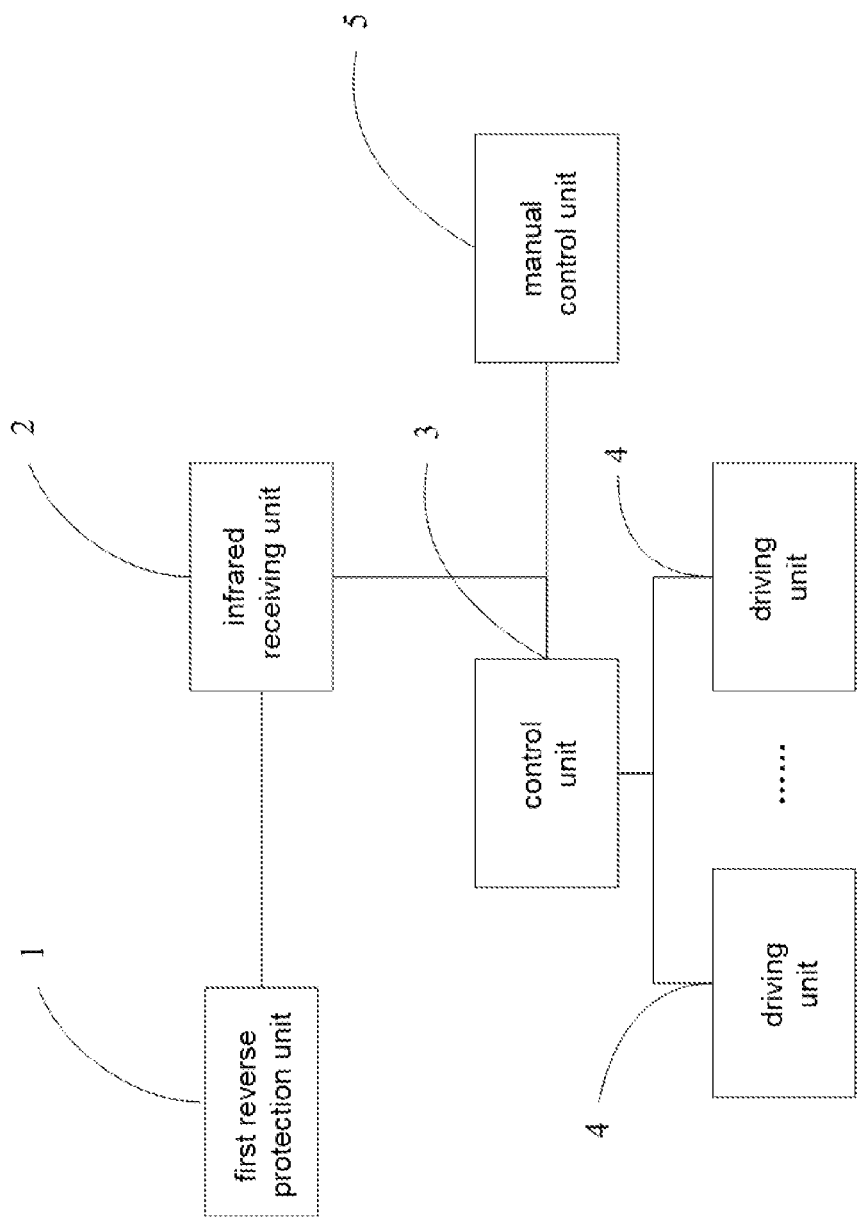
FIG. 1 is a structural block diagram of a controller for a seven-mode flowing lamp according to an embodiment.

As shown in FIG. 1, a controller for a seven-mode flowing lamp is disposed between a power source and a plurality of sets of lamp strips. The controller comprises:

a reverse protection unit 1 electrically connected to the power source to shut off the controller when the power source is reversely connected and prevent the power source from being reversely connected;

an infrared receiving unit 2 electrically connected to the reverse protection unit 1 for receiving an infrared signal transmitted by an infrared terminal;

a control unit 3 electrically connected to the reverse protection unit 1 and the infrared receiving unit 2 to parse the infrared signal and issue a plurality of control signals;

a plurality of driving units 4 disposed between the control unit 3 and the lamp strip, each of the driving units 4 receives one corresponding control signal to control a color and a frequency of light emission of the lamp strip.

In the above controller, the power supply is first controlled by the reverse protection connection unit 1 to prevent the power supply from being reversed to cause damage to the controller. After the infrared receiving unit 2 receives the infrared signal, the control unit 3 receives the infrared signal, analyzes it, and outputs a plurality of control signals to respectively control the plurality of driving units 4. Each of the driving units 4 outputs a different voltage according to a corresponding control signal to take control of the lighting effects of the lamp strip.

Figure 2:
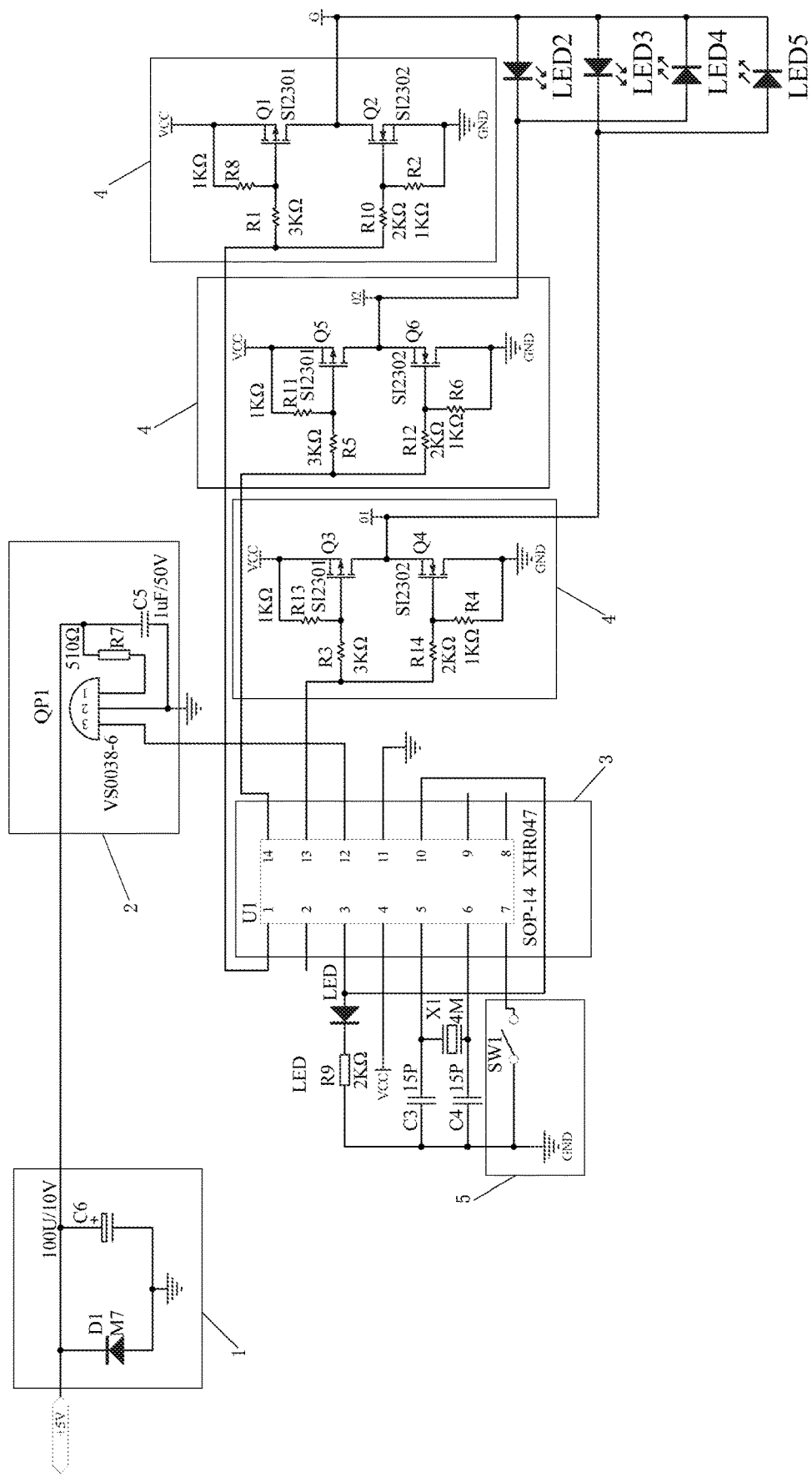
FIG. 2 is a circuit diagram of a controller for a seven-mode flowing lamp according to an embodiment.

In a further embodiment as shown in FIG. 2, the control unit 3 is a single chip U1, and the example model is SOP-14 XHR047. The single chip U1 is connected to the infrared receiving unit 2 through a pin 12 (signal receiving pin) to receive the infrared signal transmitted from the infrared receiving unit 2, and outputs three control signals respectively through pin 1 (reference signal output pin), and pins 13,14 (comparison signal output pin) to a corresponding driving unit 4. It is worth noting that there are three corresponding driving units 4, and three comparison signal output pins are respectively connected to different driving units 4. Correspondingly, if the model of the single chip U1 is changed, or the functionality of the single chip U1 is expanded, more comparison signal output pins can be incorporated and the number of the corresponding driving units 4 can also be increased.

In a further embodiment, each set of lamp strip is formed by at least one light emitting diode. The first pin of the single chip U1 outputs a reference signal, and the driving unit 4 electrically connected to the single chip U1 outputs a reference voltage. One end of each set of the lamp strips is connected to the reference voltage. In addition, the remaining comparison signal output pins output control signals, and each control signal is connected to the other end of the lamp strip via a corresponding one of the driving units 4. Briefly speaking, there are two sets of oppositely connected lamp strips between each comparison signal output pin and reference signal output pin. The lamp strips are composed of light emitting diodes, and that indicates the light emitting diodes are oppositely connected in the two sets of lamp strips. One driving unit 4 is disposed between the reference signal output pin and all of the strips, and one driving unit 4 is disposed between each of the comparison signal output pins and a lamp strip connected thereto.

In a further embodiment, each set of driving units 4 includes two MOS transistors, and the output ends of the first MOS transistor and the second MOS transistor are connected to corresponding lamp strips of the driving unit 4. In addition, a fixed voltage is connected to the source or drain of the first MOS transistor, and is further connected to the gate of the first MOS transistor via the first resistor. The second MOS transistor is grounded via the second resistor. The comparison signal output pin or the reference signal output pin is connected to the gate of the first MOS transistor via the third resistor, and is also connected to the gate of the second MOS transistor via the fourth resistor.

Specifically, the drain of the first MOS transistor Q1 and the drain of the second MOS transistor Q2 are connected to all the lamp strips in the first driving unit 4 connected at the first pin of the single chip U1. The first resistor, the second resistor, the third resistor, and the fourth resistor are respectively R8, R2 R1, and R10. They are connected to the second driving unit 4 at the fourteenth pin of the single chip U1. The drains of the first MOS transistor Q5 and the second MOS transistor Q6 are connected to two sets of lamp strips, and the LEDs on the two sets of strips are connected in opposite directions. Alternatively, each set of lamp strips is a light emitting diode, so the drain of the first MOS transistor Q5 and the drain of the second MOS transistor Q6 are connected to the light emitting diodes LED2 and LED4, and the connections of the LEDs 2 and the LEDs 4 are also opposite to each other.

In addition, the first resistor, the second resistor, the third resistor, and the fourth resistor are respectively R11, R6, R5, and R12. They are connected to the third driving unit 4 at the thirteenth pin of the single chip U1. The drain of the first MOS transistor Q3 and the drain of the second MOS transistor Q4 are both connected to two other sets of lamp strips, and the light-emitting diodes of the two other sets of strips are connected in opposite directions. That is, the drain of the first MOS transistor Q3 and the drain of the second MOS transistor Q4 are connected to the light emitting diodes LED3 and LED5, and the connections of the LED 3 and the LED 5 are opposite to each other. Further, the first resistor, the second resistor, the third resistor, and the fourth resistor are R13, R4, R3, and R14, respectively. The first pin of the single chip U1 provides a reference voltage for the LEDs 2-5 through the first driving unit 4. The thirteenth pin of the single chip U1 provides a first comparison voltage for the LED2 and the LED4 through the second driving unit 4. The fourteenth pin of the single chip U1 provides a second comparison voltage for the LED 3 and the LED 5 through the third driving unit 4. Through the magnitude and frequency of the adjustment of the first comparison voltage, the second comparison voltage, and the reference voltage, the adjustment of a total of four sets of LED lamps, the flicker frequency and the illumination intensity is realized to generate a flowing effect. In a further embodiment, the reverse protection circuit includes a diode D1 with one end connected to the other end of the power supply and a capacitor C6. The anode of the diode D1 is grounded. This connection allows lowering the input voltage when the power supply is reversely connected so as to protect the controller and the lamp strip, and improve the safety and reliability of the controller.

In a further embodiment, the infrared receiving unit 2 is composed of an infrared receiving chip QP1. Alternatively, the infrared receiving chip QP1 is of the type VS0038-6. The VCC pin (first pin) of the infrared receiving chip QP1 is connected to the output of the reverse protection circuit through the resistor R7, and the output pin (third pin) of the infrared receiving chip QP1 is connected to the 12th pin of the U1 chip (signal input pin). After the infrared receiving chip QP1 receives the infrared signal, the infrared signal is transmitted to the signal input pin of the single chip U1 through the output pin. In addition, the infrared receiving chip QP1 is grounded, and the output end of the reverse protection circuit is also grounded via the capacitor C5.

In a further embodiment, a crystal oscillator circuit is also provided at the fifth pin and the sixth pin of the single chip U1 to generate a crystal oscillator signal for the single chip U1.

Further, the controller may include a manual control unit 5 having a button SW1. One end of the button SW1 is connected to the seventh pin (manual signal input pin) of the single chip U1, and the other end is grounded. When the user presses the button SW1, each press is equivalent to the input of one control signal, and the single chip U1 is controlled to modify the voltage output from the 1st pin and/or the 13th pin and/or the 14th pin for the adjustment of the lamp strip. In addition, the 3rd pin of the single chip U1 is also grounded through an LED and a resistor R9. When the controller enters a timing mode, the LED is highlighted in red to remind the user. In a further embodiment, the above controller can be divided into two types according to the type of the controller U1: a type with memory with and a type without memory. The controller without memory displays a first mode after power-on, the flowing speed would be the slowest. Pressing the button shortly would switch the lamp strip to a second mode where the flowing speed is higher. Pressing yet again would further increase the flowing speed. Similarly, the eighth mode would keep the lights on constantly. The controller with memory displays the last mode displayed before power-ff after power-on. For example, the infrared terminal is an XRP-1 (13-key) remote controller, and the remote controller can control various functions of the product including on/off, timing, the eight modes, and light tuning of four levels. In addition, a long press on the button after power-on controls product to turn on/off and switch on/off the timing. It is worth pointing out that when the illumination intensity of the lamp strip is gradually lowered and repeated repeatedly at a certain period or frequency, a breathing effect of the lamp strip is achieved. In addition, when the light strip is illuminated, one or more of the LED lights may suddenly increase in illumination intensity (significantly higher than other LED lights) to enter a jumper pattern. The jumper pattern can appear at a certain frequency.

Based on the above embodiments, the lamp strip can be controlled by infrared means, and the user can switch the modes of the flowing lamp, including 8 modes and the 4 levels of illumination intensity, through an infrared terminal at his convenience. The flicker frequency would be different for the 8 modes and the illumination intensity would be different for the 4 levels.

Figure 3:
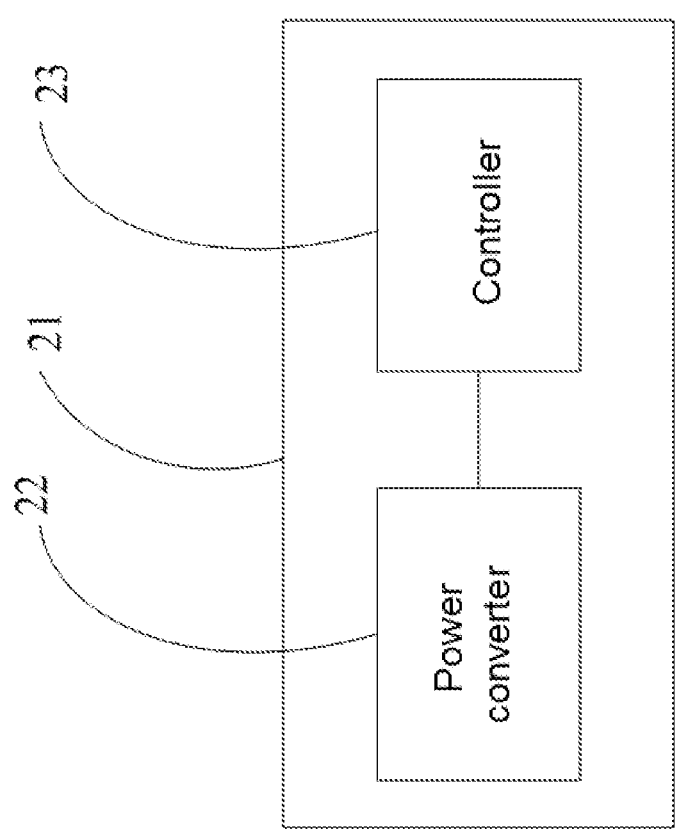
FIG. 3 is a structural block diagram of a power plug according to an embodiment.

A power plug of another embodiment in FIG. 3 comprises the radio frequency-based RUB lamp strip controller discussed above, a housing 21 and a power converter 22 disposed inside the housing 21. The power plug can be directly plugged into a socket to power and control the LED lamp strip.

Various changes and modifications will no doubt become apparent to those skilled in the art. Accordingly, the appended claims are intended to cover all such modifications and changes. The scope and content of any and all equivalents thereof are intended to be within the scope and spirit of the invention.

I claim:

1. A controller for a seven-mode flowing lamp, disposed between a power source and a plurality of sets of lamp strips, wherein the controller comprises:
   a reverse protection unit electrically connected to the power source to prevent the power source from being reversely connected;
   an infrared receiving unit electrically connected to the reverse protection unit for receiving an infrared signal transmitted by an infrared terminal;
   a control unit electrically connected to the reverse protection unit and the infrared receiving unit to parse the infrared signal and issue a plurality of control signals;
   a plurality of driving units disposed between the control unit and the lamp strip, each of the driving units receiving one corresponding control signal to control a color and a frequency of light emission of the lamp strip; and wherein
   the control unit is composed of a single-chip;
   the signal receiving pin of the single-chip is electrically connected with the infrared receiving unit;
   the reference signal output pin and two comparison signal output pins of the single-chip are respectively connected to different input ends of the driving units;
   each of the driving units includes a first MOS transistor and a second MOS transistor connected by a gate;
   the output ends of the first MOS transistor and the second MOS transistor are connected to a corresponding lamp strip of each driving unit;
   a fixed voltage is connected to a source or a drain of first MOS transistor and connected to a gate of the first MOS transistor via a first resistor;

a drain or a source of the second MOS transistor is grounded;

a gate of the second MOS transistor is grounded through a second resistor; and a gate of the first MOS transistor is used as the input terminal of each driving unit.

2. The controller according to claim 1, wherein the driving unit comprises a first driving unit connected to a reference signal output pin of the single chip, a second driving unit connected to a comparison signal output pin of the single chip, and a third driving unit connected to another comparison signal output pin of the single chip, the drains of the first MOS transistor and the second MOS transistor of the first driving unit are connected to every set of lamp strip, the drains of the first MOS transistor and the second MOS transistor of the second driving unit are connected to two sets of lamp strips, and the drains of the first MOS transistor and the second MOS transistor of the third driving unit are connected to two other sets of lamp strips which comprise oppositely connected light emitting diodes.

3. A power plug comprising the controller of claim 2, a housing and a power converter disposed inside the housing, wherein the controller is disposed in the Within the housing, and the power converter is electrically coupled to the controller.

4. The controller according to claim 1, wherein the reverse protection circuit includes a diode and a capacitor connected in parallel, the anode of the diode is grounded and the cathode of the diode is connected to the power source.

5. A power plug comprising the controller of claim 4, a housing and a power converter disposed inside the housing, wherein the controller is disposed in the Within the housing, and the power converter is electrically coupled to the controller.

6. The controller according to claim 1, wherein the infrared receiving unit is composed of an infrared receiving chip, a VCC pin of the infrared receiving chip is connected to the output end of the reverse protection circuit via a resistor, and the output pin of the infrared receiving chip is connected to the signal input pin of the single chip.

7. The controller according to claim 6, wherein the single chip is also connected to a crystal oscillator circuit.

8. A power plug comprising the controller of claim 7, a housing and a power converter disposed inside the housing, wherein the controller is disposed in the Within the housing, and the power converter is electrically coupled to the controller.

9. A power plug comprising the controller of claim 6, a housing and a power converter disposed inside the housing, wherein the controller is disposed in the Within the housing, and the power converter is electrically coupled to the controller.

10. The controller according to claim 1, wherein the controller further includes a manual control unit, the manual control unit includes a button, one end of the button is connected to a manual signal input pin of the single chip, and the other end of the button is grounded.

11. The controller according to claim 10, wherein the third pin of the single chip is grounded through a series connected LED and a series connected resistor.

12. A power plug comprising the controller of claim 11, a housing and a power converter disposed inside the housing, wherein the controller is disposed in the Within the housing, and the power converter is electrically coupled to the controller.

13. A power plug comprising the controller of claim 10, a housing and a power converter disposed inside the housing, wherein the controller is disposed in the Within the housing, and the power converter is electrically coupled to the controller.

14. A power plug comprising the controller of claim 1, a housing and a power converter disposed inside the housing, wherein the controller is disposed in the Within the housing, and the power converter is electrically coupled to the controller.

* * * * *